United States Patent [19]

Harder, Jr. et al.

[11] 3,999,733
[45] Dec. 28, 1976

[54] ADJUSTABLE VEHICLE SEAT

[75] Inventors: Arthur J. Harder, Jr., Franklin Park; Lester H. Feddeler, Oak Park, both of Ill.

[73] Assignee: Coach & Car Equipment Corporation, Elk Grove Village, Ill.

[22] Filed: Feb. 18, 1975

[21] Appl. No.: 550,283

[52] U.S. Cl. .............................. 248/400; 248/161; 297/345
[51] Int. Cl.² ...................................... F16M 13/00
[58] Field of Search .......... 248/399, 400, 401, 161, 248/405, 406, 157, 162; 297/304, 307, 345

[56] References Cited

UNITED STATES PATENTS

| | | | |
|---|---|---|---|
| 2,859,063 | 11/1958 | Underland | 248/400 |
| 3,193,239 | 7/1965 | Monroe | 248/400 |
| 3,682,431 | 8/1972 | Vivian | 248/400 |
| 3,814,370 | 6/1974 | Hurwitz | 248/400 |
| 3,861,637 | 1/1975 | DeLongchamp | 297/345 |
| 3,865,341 | 2/1975 | Fortnam et al. | 248/404 |

Primary Examiner—Robert A. Hafer
Attorney, Agent, or Firm—Merriam, Marshall, Shapiro & Klose

[57] ABSTRACT

A seat is mounted on an L-shaped trolley frame which moves vertically along two spaced rails of a seat support frame. An airspring cushion member is fixedly mounted adjacent the seat support frame and has one end interconnected with the movable trolley to cushion the downward movement of the seat. The airspring cushion has a charging valve for pressurizing the airbag and a manually operable air bleeding device for selectively relieving air pressure from the cushion to permit an occupant of the seat to select an appropriate pressure and cushioning effect. After the proper cushioning rate has been obtained, a manually adjustable height adjustment device may be used to move the seat vertically into a comfortable operating position.

3 Claims, 5 Drawing Figures

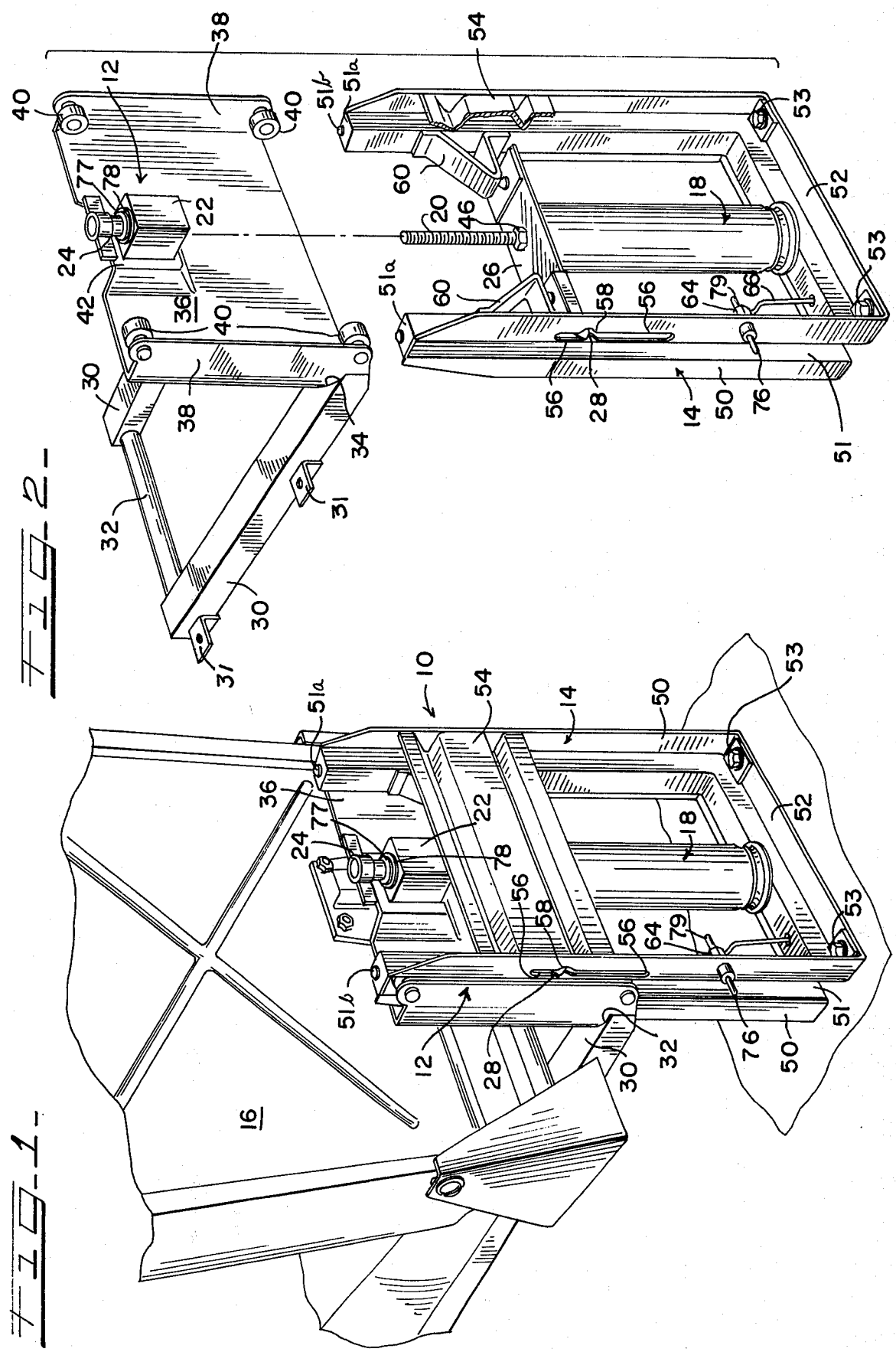

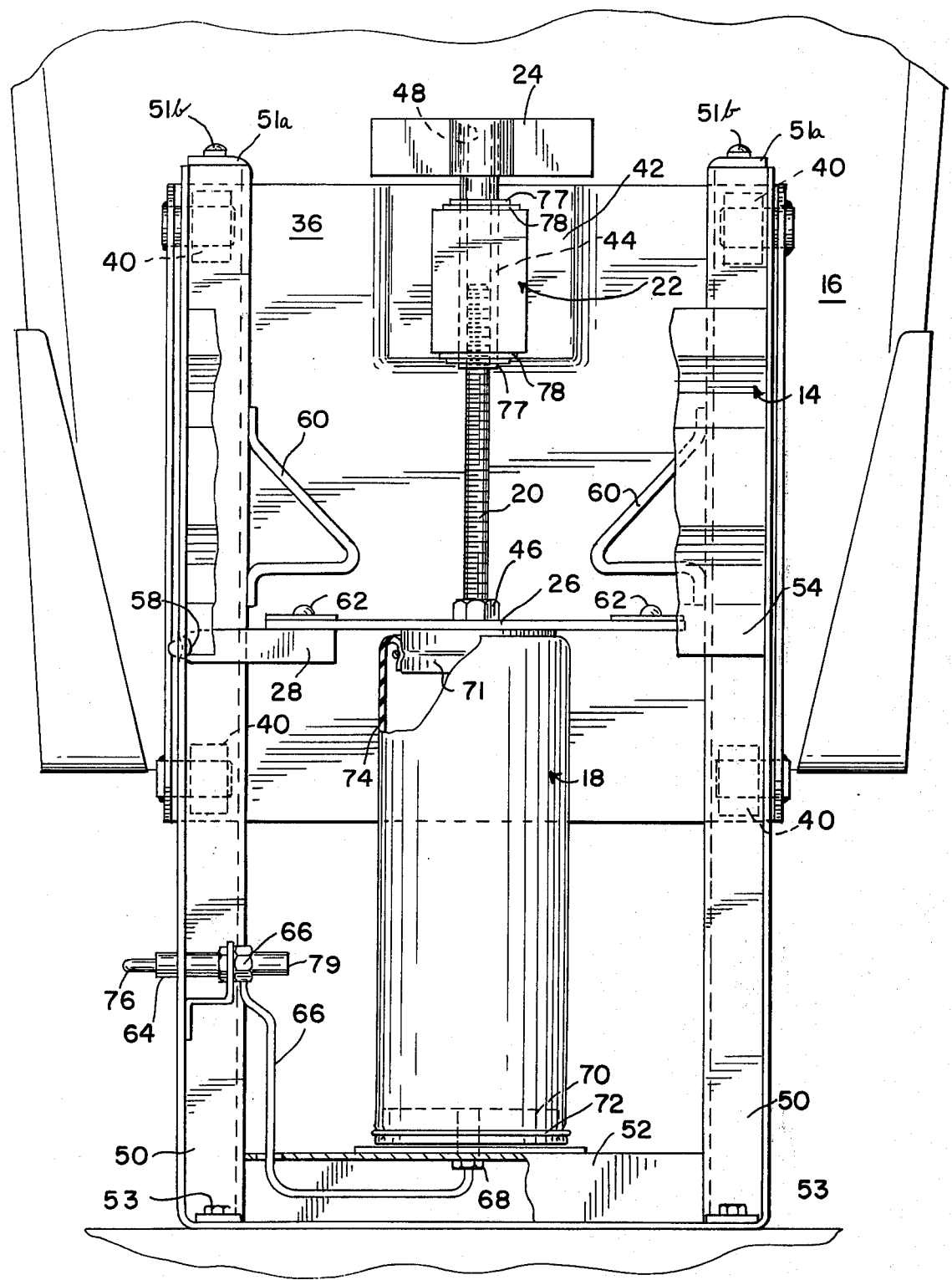
FIG_3

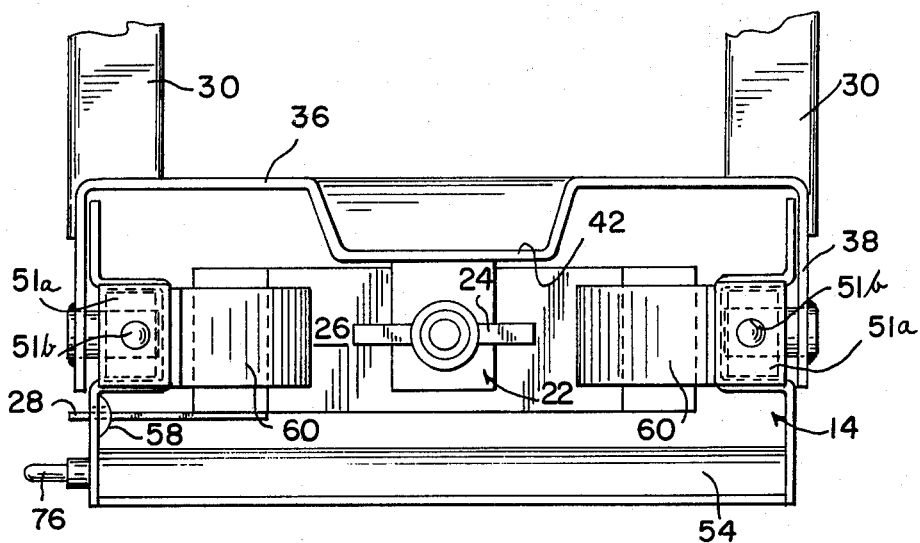
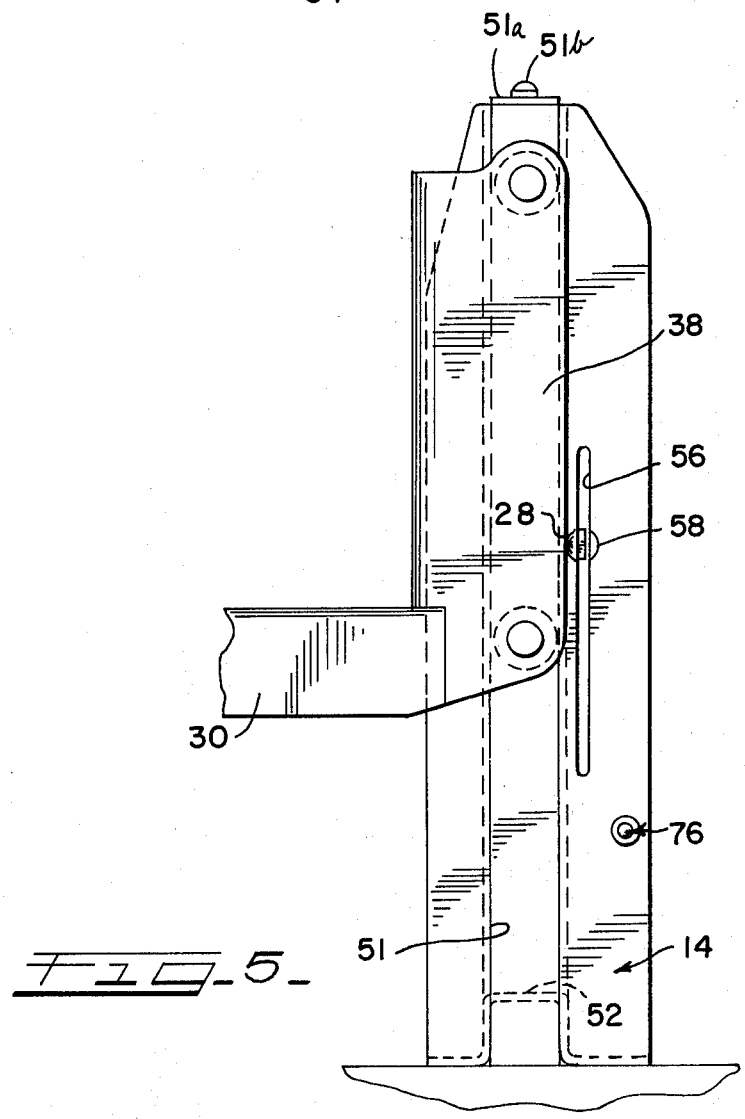

ADJUSTABLE VEHICLE SEAT

BACKGROUND OF THE INVENTION

1. Field of the Invention

This invention pertains generally to supports for vehicle seats and, in particular, to a cushion and height adjustment device for seats generally used in vehicles such as buses, trucks, off-the-road construction type vehicles, and farm vehicles.

2. Description of the Prior Art

Some prior art seat cushioning devices use coil springs or pneumatic air bags to support a seat. The cushioning devices provide a fixed spring rate or cushioning effect aimed at producing a comfortable ride for an occupant of average size and height. Such cushioning devices are unacceptable because of the variations in sizes and weights of vehicle operators who normally occupy this type of seat. In the event an extremely heavy operator were to sit on a seat designed for an average weight person, he would feel uncomfortable at best, and, at worst, there could be no spring effect at all because the springs could bottom out during travel over extremely rough terrain. On the other hand, a very lightweight operator would receive an extremely stiff ride from seat cushion springs designed for the seat occupant of average weight.

Furthermore, seat cushioning devices having a variable or adjustable spring rate cannot be easily adjusted vertically, after spring adjustment, for each individual seat occupant without changing the cushioning of the seat.

SUMMARY OF THE INVENTION

The present invention provides a single seat support comprising an air spring cushion or air bag which initially may be charged to a high pressure and thereafter may be bled of air by the seat occupant, without leaving the seat, until a comfortable ride condition is reached. Additionally, once a comfortable ride condition has been found, the height of the seat may be raised or lowered to correspond with the height of the operator or to compensate for any changes in the vertical position of the seat which may have occurred during the adjustment of the airspring cushion. This height adjustment is accomplished without changing the cushioning effect. There is a mechanical connection between the airspring cushion and the seat, and the height-adjusting mechanism is part of this mechanical connection.

An air valve is provided for selectively charging or pressurizing the air bag, and a hand-engageable bleed lever is positioned within convenient reach of the vehicle operator to allow air to be selectively removed from the air bag until a suitable cushioning condition or effect has been achieved. A rotatable handle may be easily engaged to manually adjust the height of the seat after a proper cushioning effect has been obtained.

To assist in adjusting the height of the seat, an indicator unit is provided at a convenient location adjacent the air valve. This height indicator may be sensed visually or by touch to determine the relative height of the seat by comparing the location of a movable indicator to that of an average height mark on the indicator unit.

Other features and advantages of the invention will become apparent to those skilled in the art from the following description, attached drawings, and appended claims.

DESCRIPTION OF THE DRAWINGS

FIG. 1 is a perspective of a vehicle seat and an associated supporting and cushioning arrangement constructed in accordance with the present invention;

FIG. 2 is an exploded perspective of the supporting and cushioning arrangement;

FIG. 3 is a rear view of the seat supporting arrangement showing the air cushioning and height adjusting structure;

FIG. 4 is a top plan view of the seat supporting structure shown in FIG. 3; and, FIG. 5 is a side elevational view of a seat supporting arrangement.

DETAILED DESCRIPTION OF A PREFERRED EMBODIMENT

Referring now to FIGS. 1 and 2, designated generally at 10 is a seat supporting and cushioning arrangement or unit including an L-shaped seat support trolley 12, movably mounted on a rigid frame assembly or tower 14 securely mounted to the vehicle deck or underframe structure. A seat 16 is securely attached to support trolley 12. A fluid type spring in the form of an air bag 18 may be positioned between the support trolley 12 and the associated tower or frame assembly 14 to provide a resilient cushion between the members 12 and 14. In the embodiment shown, an air-type fluid spring is used; however, the invention may be practiced with other types of fluid springs.

As shown in FIGS. 2 and 3, a threaded stud 20 extends from air spring 18 into an adjusting block 22 when the seat is assembled. A rotatable adjusting handle 24 on adjusting block 22 may be manually rotated to raise and lower trolley 12 relative to frame assembly 14.

For indicating the height of the seat, a crossbar 26, mounted on top of airspring 18, extends tranversely of frame assembly 14. Crossbar 26 limits the vertical expansion of airspring 18 and also provides a mounting surface for a height and position indicator arm 28 shown in FIGS. 3 and 5.

As shown in FIG. 2, L-shaped trolley 12 includes a pair of horizontally extending side beams 30 interconnected at their outermost ends by a transversely extending bar or torque tube 32. Side beams 30 have contoured attaching ends 34 fitted around a back plate 36. Side beams 30 in combination with torque tube 32 and back plate 36 provide a rigid, rectangular seat supporting frame to securely mount a seat to tabs 31 on beams 30. This seat supporting frame provides adequate support for a seat occupant with an appropriate safety factor.

Back plate 36 undergoes a variety of loading modes involving the application of bending, vibrational, shear and twisting forces, and, necessarily, plate 36 must be a rigid member to accommodate the above. Back plate 36 includes side flanges 38 bent at a right angle to provide rigid mounting means for two pairs of vertically spaced heavy duty guide rollers 40 which may be made from acetal polymer thermoplastics to absorb the heavy loading to which they are subjected in operation. Back plate 36 also includes an outwardly formed section or deformation 42 which acts as a mounting pad for adjusting block 22. Deformation 42 also rigidifies the central portion of back plate 36.

Referring to FIG. 3, adjusting block 22 has a vertically extending bore containing a tubular sleeve 44 retained in place by a retaining ring 77 and internally threaded to engage stud 20. The upper portion of sleeve 44 is secured to rotatable adjusting lever 24 which also includes a hollow chamber 48 through which threaded stud 20 may extend. Rotation of adjusting lever 24 rotates sleeve 44 which moves adjusting block 22, with the attached seat support trolley 12, vertically on threaded stud 20 depending on the direction of rotation of the adjusting lever. This vertical adjustment mechanism provides for convenient customized height positioning of the seat to accommodate the size or height of a particular vehicle operator.

Refeiring to FIGS. 1 and 2, frame assembly or tower 14 includes a pair of spaced side rails 50 each extending vertically from a base member 52 secured by hold down bolts 53, or other fasteners to the supporting deck of the vehicle. Side rails 50 and base member 52 may have a hat-shaped cross-section, and the channel or U-shaped portions of the two side rails 50 provide a pair of vertically extending runners or tracks 51 in which the L-shaped support trolley 12 is positioned for movement. The bottom terminal of each track is defined by the vehicle's supporting deck, and the top terminal of each track is defined by a suitable stop plate 51a which may include a pair of rubber bumpers 51b, each mounted in a suitable opening in plate 51a and extending into a respective runner 51 to cushion any contact which could occur between a roller 40 and stop plate 51a.

Seat supporting and cushioning unit 10 is assembled by fitting together tower 14 and trolley 12. During assembly, sleeve 44 is inserted within adjusting block 22 and held there by thrust washer 78 and retaining ring 77. Next, threaded stud 20 is inserted into sleeve 44, through nut 46 and crossbar 26 and into an attaching disc 71 on air bag 18. Next, adjusting block 22 is fitted onto mounting pad 42 of the back plate 36.

Tower 14 also includes a brace 54 interconnecting the central and upper portions of each side rail 50 to rigidify the tower. Additionally, one side rail 50 includes a vertically extending slot 56 (FIGS. 1, 2, and 5) positioned to permit a height and position indicator 28 to extend therethrough to an extent sufficient to be hand-felt by an operator seated on seat 16. A locator depression 58, formed as part of slot 56, defines a recommended or average height adjustment for the seat. The operator may adjust the height of the seat by rotating adjusting handle 24 while at the same time referring visually or by touch to the relative locations of position indicator 28 and depression 58 of the vertically extending slot 56.

A pair of stop brace units 60 are attached to the inside of each side rail 50 to limit the vertical upward movement of crossbar 26 which moves in unison with the top of air bag 18. Each stop brace unit 60 is positioned to engage one of a pair of rubber bumpers 62 positioned on each side of crossbar 26.

The air charging and cushion adjusting means of the invention will now be described with reference to FIGS. 1, 2 and 3. As shown in FIG. 3, air bag 18 has an associated air valve 64 mounted on one of the side flanges of a side rail 50. Air valve 64 is coupled to one end of an associated feed line 66 having another end coupled by an adaptor 68 to air bag 18. Air bag 18 includes a rubber boot 74, a lower mounting block 70 and an upper mounting disc 71 and may include a locking ring 72 fitted about the outside of boot 74 to securely fasten the boot to lower mounting block 70.

Charging valve 64 may be a common size of fitting used on automobile or truck tires, and valve 64 may be threaded or otherwise easily fitted to conventional air pumps for charging air into air bag 18. Valve 64 includes an air bleed button 76 which may be depressed to remove air from air bag 18; and valve 64 also includes a charging port 79 to pressurize air bag 18 (FIG. 3).

In summary, it is possible for an operator to adjust for a custom cushioning effect and seat height. Air may be initially charged through air valve 64 at charging port 79 to pressurize the air bag 18 and extend it to a fully extended position at which rubber bumpers 62 on crossbar 26 engage stops 60 on tower 14. Thereafter, the operator may be seated upon the seat 16 and simply reach slightly behind him to depress bleed button 76 and remove air from air bag 18 until a comfortable cushioning effect has been obtained. In the event enough air is bled from air bag 18 to lower the seat too much, the operator may simply feel behind him to determine the relative position of height indicator 28 with respect to depression 58 of slot 56. If the indicator 28 is lower than the height position by suggested depression 58, the operator may engage the adjusting handle 24 and manually rotate the latter until the seat has been raised to a desired height.

The cushioning effect may be adjusted during vehicle use to adapt to various terrains over which the vehicle is moving, following which the height of the seat may be adjusted to compensate for any change in vertical height which could have occurred during adjustment of the cushioning effect.

Air bag 18 may be easily charged with high pressure air from a handpump, and it is not necessary that a high pressure compressor be available. There are few moving parts thereby enhancing the life expectancy and reliability of the unit. This seat unit is designed for operation in the most adverse atmospheres and environments typically encountered by off-the-road construction vehicles and farm equipment on which the present seat unit is to be used.

The foregoing description and drawings merely explain and illustrate the invention, and the invention is not limited thereto, as those skilled in the art who have a disclosure before them will be able to make modifications and variations therein without departing from the scope of the invention.

What is claimed is:

1. A seat supporting arrangement for providing a seat with both adjustable cushioning and adjustable height capabilities, said arrangement comprising:
   first frame means;
   a seat on said first frame means;
   means mounting said first frame means for movement with said seat in a generally vertical direction;
   second frame means fixed with respect to said first frame means and including means for guiding said first frame means in a restricted vertical movement;
   adjustable fluid spring means having a fixed end and having a movable end; said fluid spring being operable for selectively cushioning and vertically adjusting said first frame means;
   mechanical means for adjusting the vertical position of said first frame means and having means attached to the first frame means; and,
   said last-recited mechanical adjusting means comprising manually operable rotatable handle means and elongated threaded indexing means, said threaded indexing means having one end connected in tandem with the movable end of said fluid spring means and having another end cooperative with said rotatable handle means for providing associated vertical movement of the first frame means and seat when said handle means is rotated.

2. The seat supporting arrangement of claim 1 wherein said fluid spring means comprises:
a flexible boot providing an inflatable chamber for containing fluid;
means responsive to movement of the first frame means to vary the volume of fluid in said boot; and,
valve means positioned alongside said seat for admitting and releasing fluid from the flexible boot for producing relative height and cushioning adjustment of the first frame means relative to the second frame means.

3. The seat supporting arrangement of claim 13, and:
first indictor means comprising a laterally extending finger movable with the first frame means; and,
second indicator means mounted on the second frame means and cooperative with said finger to display the relative vertical position of the first frame means.

* * * * *

UNITED STATES PATENT AND TRADEMARK OFFICE
CERTIFICATE OF CORRECTION

PATENT NO. : 3,999,733
DATED : December 28, 1976
INVENTOR(S) : Arthur J. Harder, Jr. et al.

It is certified that error appears in the above—identified patent and that said Letters Patent are hereby corrected as shown below:

Column 3, line 13, change "Refeiring" to --Referring--;
Column 6, line 6, change "claim 13" to --claim 1--.

Signed and Sealed this

Fifteenth Day of March 1977

[SEAL]

Attest:

RUTH C. MASON
Attesting Officer

C. MARSHALL DANN
Commissioner of Patents and Trademarks